Sept. 25, 1951  H. E. BRANDT  2,569,369
DUSTING DEVICE
Filed March 29, 1945  2 Sheets-Sheet 1
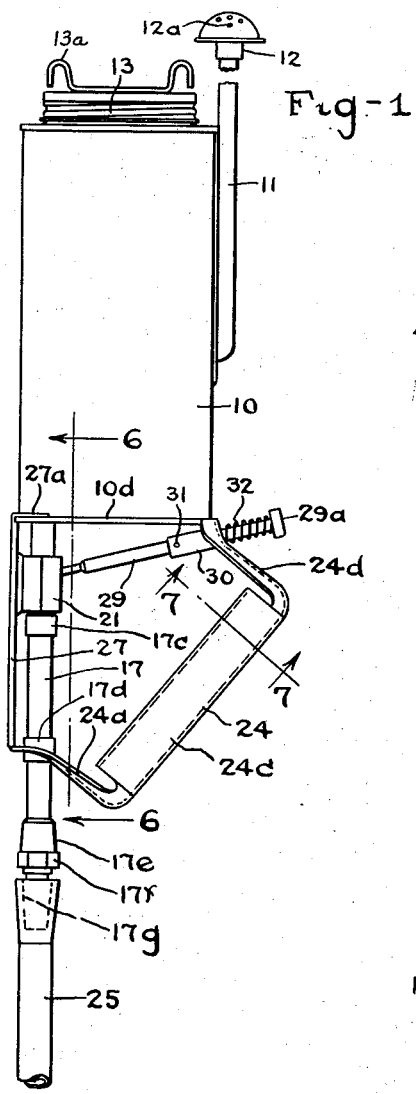
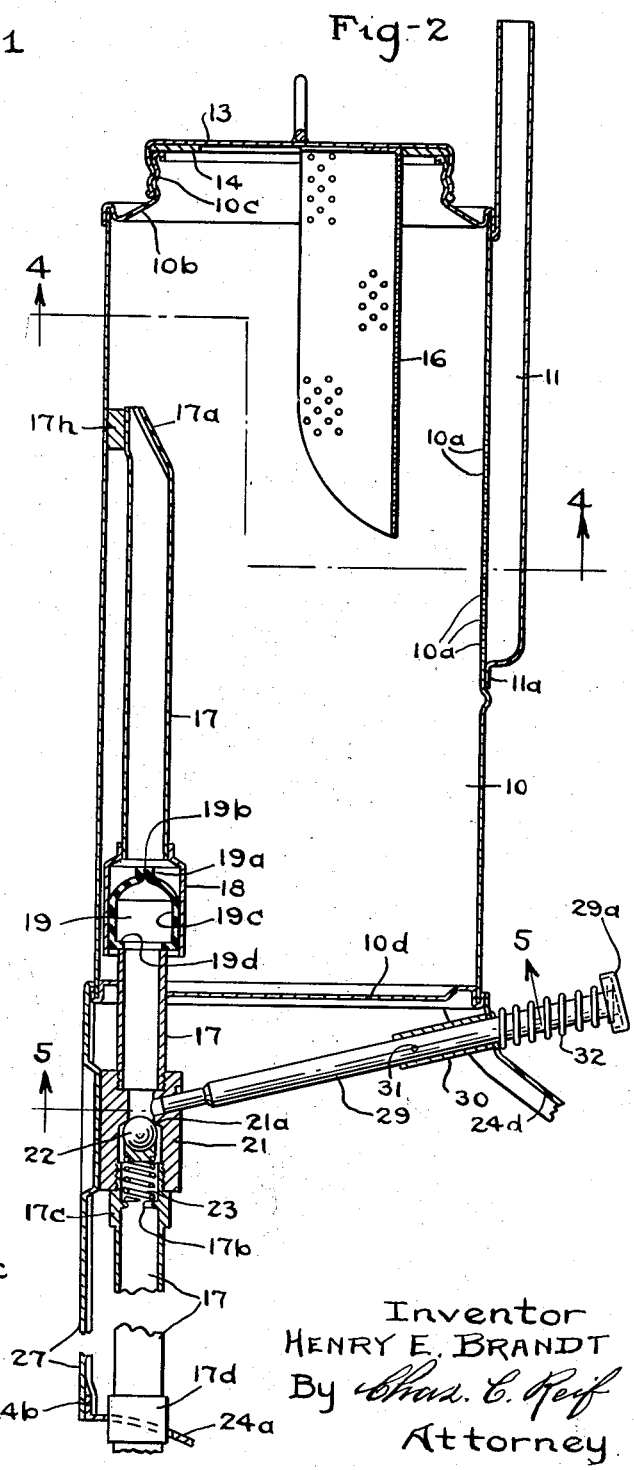
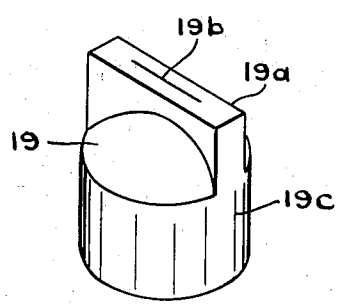
Inventor
HENRY E. BRANDT
By Chas. C. Reif
Attorney Sept. 25, 1951     H. E. BRANDT     2,569,369
DUSTING DEVICE
Filed March 29, 1945     2 Sheets-Sheet 2
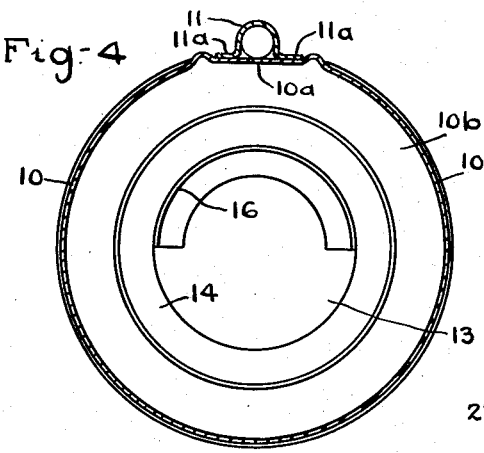
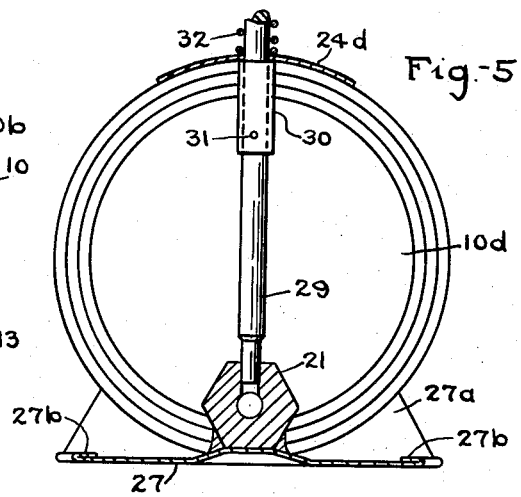
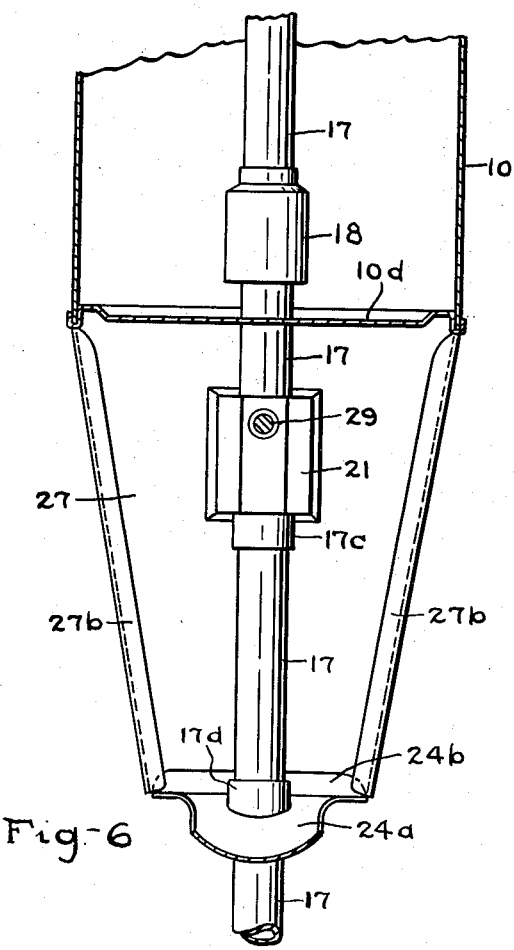
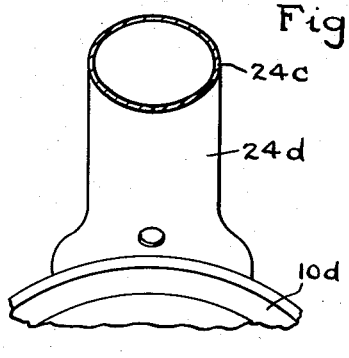
Inventor:
HENRY E. BRANDT
By Chas. E. Reif
Attorney Patented Sept. 25, 1951

2,569,369

UNITED STATES PATENT OFFICE 2,569,369

DUSTING DEVICE

Henry E. Brandt, North St. Paul, Minn.

Application March 29, 1945, Serial No. 585,456

9 Claims. (Cl. 43—147)

1

This invention relates to a dusting device such as is used to spray insecticide powders or dust onto plants or other objects. While the invention may have various applications, it is illustrated as embodied in a dusting device adapted to be carried by the operator and having a conduit adapted to be connected to a source of air under pressure.

It is an object of this invention to provide a dusting device constructed and arranged to be easily carried and manipulated and to effectively distribute the dust onto the desired objects.

It is another object of the invention to provide a dusting device comprising a casing forming a dust receiving chamber, a discharge conduit leading from said chamber, an air supply conduit communicating with said chamber and projecting at one end of said casing and adapted to be connected to a source of air under pressure, a check valve in said air supply conduit and conveniently located and easily operated means for opening said check valve to admit air into said chamber.

It is also an object of the invention to provide a dusting device as set forth in the preceding paragraph, said air supply conduit having a valve therein within said chamber adapted to be opened by the passage of air through said air supply conduit and to close upon the cessation of said air supply to prevent dust from passing into said check valve.

It is still another object of the invention to provide a dusting device comprising a casing preferably of cylindrical form, the same having a dust receiving chamber therein, a discharge conduit projecting at the front end of said casing, an air supply conduit projecting at the other end of said casing, a handle for carrying said device secured to the latter end of said casing, said air supply conduit having a check valve therein and a plunger for controlling said check valve, said air supply conduit and plunger being supported by said handle.

It is more specifically an object of the invention to provide a dusting device such as set forth in the preceding paragraph including a valve casing for said check valve secured to said handle.

It is still another object of the invention to provide a dusting device comprising a casing forming a dust receiving chamber, a discharge conduit at one side of said casing and having a discharge end at the front of said casing, said conduit communicating through a plurality of small openings with said chamber, an air supply conduit extending into the front end of said chamber and having an end within said chamber disposed somewhat adjacent the front end of said chamber, said casing having a filling opening at its front end, a cap for closing said opening and a screen carried by said cap and adapted to be disposed between said discharge end of said air supply conduit and said discharge conduit.

These and other objects and advantages of the invention will be fully set forth in the following description made in connection with the accompanying drawings in which like reference characters refer to similar parts throughout the several views and in which:

Fig. 1 is a view in side elevation of said dusting device;

Fig. 2 is a partial central vertical section through said device;

Fig. 3 is a perspective view of a valve used;

Fig. 4 is a vertical section taken substantially on line 4—4 of Fig. 2, as indicated by the arrows;

Fig. 5 is a vertical section taken substantially on line 5—5 of Fig. 2, as indicated by the arrows;

Fig. 6 is a horizontal section taken on line 6—6 of Fig. 1, as indicated by the arrows;

Fig. 7 is a section taken substantially on line 7—7 of Fig. 1, as indicated by the arrows; and Fig. 8 is a perspective view of the discharge end of an air supply conduit.

Referring to the drawings, a dusting device is shown comprising a casing 10. While this casing could be of various forms, in the embodiment of the invention illustrated it is shown as cylindrical and somewhat elongated. The casing 10 has a chamber therein or forms a chamber adapted to receive the dust to be sprayed. A discharge conduit 11 is secured along one side of casing 10 and projects forwardly a short distance at the front end of said casing, which conduit may be provided with a spray nozzle 12, the same being illustrated as having a semi-spherical end with a multiplicity of small holes or perforations 12a therein. As shown in Fig. 4, the top of casing 10 is flattened for a short transverse portion thereof where conduit 11 is connected thereto and said conduit is provided with outwardly extending flanges 11a secured to said flattened portion in any suitable manner as by soldering or welding. The wall of casing 10 beneath conduit 11, and preferably centrally thereof, is provided with a multiplicity of small holes or perforations 10a. Casing 10 has a front end 10b flanged to extend over the end of said casing and be connected thereto by soldering or welding. End 10b tapers inwardly and forwardly somewhat and has a threaded cylindrical end portion 10c open at its outer end to provide a filling opening for casing 10. Said opening is closed by a cap 13 having a threaded flange adapted to be screwed upon the threaded portion 10c, said cap preferably having a gasket 14 adapted to engage the inturned end of portion 10c to provide a tight closure. Cap 13 is provided with a suitable handle 13a for turning the same and in the embodiment of the invention illustrated this is shown as a small rod or wire extending across the outer end of said cap and secured thereto by soldering or welding, said rod having outwardly and reversely turned ends. Cap 13 has secured thereto and projecting inwardly therefrom a screen or perforated plate 16, the same preferably being of concavo-convex form in transverse cross section, the same being disposed between discharge conduit 11 and an air supply conduit to be later described, said screen having its concave side directed toward said air supply conduit. The sides of said plate 16 are tapered toward its inner end. Said cap and plate thus form a scoop.

An air supply conduit 17 extends into the chamber 10 through the rear end 10d thereof, which rear end has a flange at its periphery extending over and secured to the end of casing 10. Said air supply conduit extends along the inner wall of casing 10 and has a flattened discharge end 17a having a discharge opening therethrough. The inner end of conduit 17 is supported by and secured to casing 10 by a small block 17h of solder or other material. The discharge end of conduit 17 is clearly shown in Fig. 8. Within the chamber of casing 10 and adjacent the rear end 10d conduit 17 is secured to a valve casing 18 within which is disposed a valve 19. Valve 19 is of the check valve type and is illustrated as made of a resilient sheet such as rubber having a flattened end 19a substantially rectangular in cross section, said end having a discharge slit 19b extending thereacross for the major portion of its width. The rear end 19c of valve 19 is cylindrical and fits against the wall of casing 18, the same having an inwardly extending flange 19d with a central opening therethrough. Conduit 17 extends from the rear end of valve 19 through end wall 10d and into a valve casing 21. Valve casing 21 is provided with a valve seat 21a adapted to be engaged by a ball valve 22 having a short plunger at one side slightly reduced in diameter at its rear end and extending into the end of a compression coiled spring 23, the other end of which seats against an inwardly extending flange 17b in the rear end of conduit 17. Spring 23 tends to hold ball 22 against seat 21a and thus to hold the valve in closed position. The rear portion of conduit 17 has an end threaded into valve casing 21 and has an enlarged portion 17c engaging the end of valve casing 21. Conduit 17 extends rearwardly having another enlarged portion 17d extending into one portion of a handle 24 and said conduit has an end portion 17e provided with an intermediate hexagonal part 17f and a terminal tapered portion 17g over which a flexible or resilient tube 25 may be disposed to connect conduit 17 to a suitable source of air under pressure. A plate 27 of trapezoidal shape in plan, as shown in Fig. 6, has a vertically extending end or flange 27a at its front end recessed to receive the casing 10 just forwardly of the rear end 10d, said flange 27a being secured to casing 10 by soldering or welding. Plate 27 tapers toward its rear end and has inturned portions or flanges 27b at each side. A handle 24 has a lower portion 24a which extends downwardly and forwardly, the same being shown as somewhat curved and having a short forwardly projecting flange 24b overlying the front end of plate 27 and having its outer portions disposed beneath the flanges 27b. The enlarged portion 17d of conduit 17 extends through an aperture in portion 24a. Handle 24 has a grip portion 24c of elliptical or cylindrical shape in cross section and which is formed by bending the sides of said handle downwardly and inwardly. Handle 24 also has a portion 24d extending from the upper end of portion 24c downwardly and forwardly to the top of casing 10 to which top it is secured by soldering or welding. Portion 24d extends some distance circumferentially of casing 10, as shown in Fig. 5.

A plunger 29 has a reduced lower end extending into and fitting into a bore in the top of valve casing 21. Said bore is so located that when plunger 29 is depressed it will engage the front end of ball 22 and cam or push the same rearwardly against the pressure of spring 23 thus opening the valve. Plunger 29 extends upwardly and slightly forwardly and through an aperture in portion 24d of handle 24. A sleeve 30 is secured to plunger 29 in any suitable manner as by a pin 31, the upper end of sleeve 30 engaging the underside of portion 24d to limit the upward movement of plunger 29. Plunger 29 is provided with a head 29a shown as of inverted cup form, and a compression coiled spring 32 engages the underside of head 29a, the lower end of said spring engaging the top of portion 24d. Spring 32 thus acts to hold plunger 29 in elevated position.

In operation the dust to be sprayed will be placed in the chamber in casing 10 by removing cap 13. When cap 13 is replaced to close the filling opening, the screen 16 comes into the position shown in Fig. 2. The tube 25, as stated, will be connected to a suitable source of air under pressure. The operator grasps the portion 24c of handle 24 with his hand and he can then easily operate plunger 29 with his thumb or forefinger. When plunger 29 is depressed, ball 22 is forced from its seat and air passes through conduit 17 into the chamber in casing 10. The air passes through valve 19 and expands portion 19a thus opening the slit 19b to permit the passage of air. The air is directed by the end 17a of conduit 17 forwardly and somewhat downwardly at the front end of casing 10 and the air being deflected by the wall of casing 10 and the end thereof creates a whirl and stirs up and lifts the dust in the chamber of casing 10. The air passes out through the holes 10a and through discharge conduit 11 carrying the dust with it. The dust is thus discharged in a spray through the conduit 11 or through the nozzle 12 when the latter is used. The dust also passes through screen 16 and this screen protects the openings 10a and insures that the dust will be in fine condition before passing to said openings. When the operator releases plunger 29 it is moved to its upper position and spring 23 moves ball 22 against its seat thus shutting off the supply of air. Valve 19 immediately contracts and this prevents any substantial amount of powder passing rearwardly of said valve. The powder is thus prevented from passing to valve casing 21. The scoop formed by plate 16 and cap 13 can be used to place the material in container 10.

From the above description it will be seen that I have provided a simple and very efficient dusting device. The same is easily carried and manipulated and the plants or other objects can be quickly and efficiently sprayed. The operator can hold the device in one hand and with his other hand turn up the leaves of the plants if desired so that the undersides of the leaves can be sprayed. The whole plant can thus be effectively covered. The parts are designed for efficient production and are conveniently arranged. Handle 24 is made of one piece of material. Plate 27 could be considered as part of the handle. The device can be easily and quickly provided with a suitable weatherproof coating. The device has been amply demonstrated in actual practice and found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A dusting device having in combination, a container forming a dust receiving chamber and casing, a discharge conduit projecting at the front end of said chamber and communicating with said chamber, an air supply conduit extending into said casing and communicating with said chamber, the same projecting at the rear end of said casing and being adapted to be connected to a source of air under pressure, a handle having one end secured to one side of said container at said rear end, said handle having a portion extending upwardly and rearwardly, said handle having a grip portion extending downwardly and rearwardly from said first mentioned portion, having a third portion extending from said grip portion downwardly and having a fourth portion extending forwardly substantially parallel to a side of said casing and connected to said casing at a point substantially opposite said first mentioned portion.

2. The structure set forth in claim 1, said air supply conduit having a valve casing therein secured to said last mentioned portion of said handle, said valve casing having a check valve therein, a plunger extending upwardly from said valve casing through the first mentioned portion of said handle adapted to be depressed for opening said check valve and resilient means for holding said plunger in elevated position.

3. A dusting device having in combination, a casing forming a dust receiving chamber, a discharge conduit extending from the front end of said casing longitudinally thereof, an air supply conduit extending longitudinally of and at the rear end of said casing, a plate secured to the rear end of said casing adjacent the bottom side thereof and extending longitudinally of said casing and rearwardly in tapered form quite a distance beyond said rear end, and a handle having a front portion secured to said casing, an intermediate grip portion, and a lower portion secured to the rear end of said plate.

4. The structure set forth in claim 3, said grip portion extending downwardly and rearwardly from its front end.

5. The structure set forth in claim 3, said air supply conduit extending through said lower portion of said handle.

6. The structure set forth in claim 3, a check valve casing secured to said plate, a check valve in said casing, and a plunger for operating said valve extending from said valve casing upwardly through said front portion of said handle and substantially transversely of said casing.

7. A dusting device having in combination, a casing forming a dust-receiving chamber, a discharge conduit communicating with said chamber, an air supply conduit communicating with said chamber, the same extending outwardly at one end of said casing, said air supply conduit being adapted to be connected to a source of air under pressure, a check valve in said air supply conduit, means adapted to be manipulated by the operator for controlling said valve, and a handle at said end of said casing adapted to be grasped for carrying said device and having portions spaced from said container, said air supply conduit passing through and being supported in one of said portions and said last mentioned means comprising a plunger passing through and being supported in another of said portions.

8. A dusting device having in combination, a container having a dust-receiving chamber, a discharge conduit at one end of said container and communicating with said chamber, an air supply conduit communicating with said chamber, the same projecting at one end of said container, said air supply conduit being adapted to be connected to a source of air under pressure, a check valve in said air supply conduit and means adapted to be moved by the operator for opening said valve, means for holding said last mentioned means in inoperative position, said check valve comprising a valve seat, a ball adapted to engage said seat, and resilient means acting to hold said ball against said seat to close said valve, said first mentioned means comprising a plunger being positioned so that when it is depressed its end moves against said ball and moves the same against the pressure of said resilient means to open said valve.

9. A dusting device having in combination, a casing having a dust receiving chamber, said casing having a tight fitting cap for closing one end thereof, a discharge conduit parallel to one side of said casing, an air supply conduit extending into said casing parallel to the opposite side thereof, the same projecting outwardly through the top of said casing, said air supply conduit being adapted to be connected to a source of air under pressure, a check valve in said air supply conduit at the portion outside of said casing, and means adapted to be moved by the operator for opening said valve, means for holding said last mentioned means in inoperative position and a handle having one end secured to one side of said casing at the rear thereof, said handle having a portion extending generally upwardly and rearwardly, and having a third portion extending forwardly substantially parallel to a side of said casing and connected to said casing at a point substantially opposite said first mentioned point of connection, said air supply conduit extending through and secured to said last mentioned portion of said handle, and means for operating said valve in said conduit extending through and operative through said first mentioned portion of said handle.

HENRY E. BRANDT.

REFERENCES CITED

The following references are of record in the file of this patent:

UNITED STATES PATENTS

| Number | Name | Date |
|---|---|---|
| 1,021,015 | Tarrant | Mar. 26, 1912 |
| 1,715,986 | Brown | June 4, 1929 |
| 1,877,778 | Tappan | Sept. 20, 1932 |
| 2,061,379 | Hudson | Nov. 17, 1936 |
| 2,068,871 | Rose | Jan. 26, 1937 |
| 2,086,696 | Brandt | July 13, 1937 |
| 2,137,526 | Collins | Nov. 22, 1938 |
| 2,187,376 | Guibert | Jan. 16, 1940 |
| 2,341,036 | Guibert | Feb. 8, 1944 |

FOREIGN PATENTS

| Number | Country | Date |
|---|---|---|
| 13,620 | Australia | July 31, 1934 |
| 208,909 | Great Britain | Jan. 3, 1924 |